United States Patent [19]

Tsuji et al.

[11] Patent Number: 5,427,616
[45] Date of Patent: Jun. 27, 1995

[54] PROCESS FOR THE PRODUCTION OF COPPER PHTHALOCYANINE PIGMENT COMPOSITION

[75] Inventors: Kosaku Tsuji; Yoshio Muramatsu; Shigeki Kato, all of Tokyo, Japan

[73] Assignee: Toyo Ink Manufacturing Co., Ltd., Tokyo, Japan

[21] Appl. No.: 251,964

[22] Filed: Jun. 1, 1994

[30] Foreign Application Priority Data

Jun. 4, 1993 [JP] Japan .................................. 5-134360

[51] Int. Cl.$^6$ ............................................. C09B 67/50
[52] U.S. Cl. ................................. 106/412; 106/410; 106/411; 540/122; 540/123; 540/124; 540/125; 540/127; 540/139; 540/140; 540/141
[58] Field of Search ...................... 106/411, 412, 410; 540/122, 123, 124, 125, 127, 139, 140, 141

[56] References Cited

U.S. PATENT DOCUMENTS 3,767,442 10/1973 Kienzle et al. ...................... 106/412
4,448,607 5/1984 Johnson et al. ..................... 106/411

FOREIGN PATENT DOCUMENTS 0020306 12/1980 European Pat. Off. ............ 106/412
0422907 4/1991 European Pat. Off. .
1434259 2/1966 France .
2281409 3/1976 France .
2333836 7/1977 France .
3331998 3/1984 Germany .
1096192 12/1967 United Kingdom .
1469595 4/1977 United Kingdom .
1562716 3/1980 United Kingdom .

*Primary Examiner*—Mark L. Bell
*Assistant Examiner*—Scott L. Hertzog
*Attorney, Agent, or Firm*—Wenderoth, Lind & Ponack

[57] ABSTRACT

A process for the production of a copper phthalocyanine pigment composition from 70 to 99% by weight of a crude copper phthalocyanine and 30 to 1% by weight of a phthalocyanine derivative, the crude copper phthalocyanine being converted to a pigment without a large amount of energy and the treatment of exhaust water, the copper phthalocyanine pigment composition having excellent fluidity, tinting strength and stability with time when used in a coating composition or a printing ink, the copper phthalocyanine pigment composition showing almost no "strike-through" when used for gravure printing on low-quality paper, the process comprising dry milling the entirety of the crude copper phthalocyanine and the phthalocyanine derivative in an amount of 0.5 to 10% by weight of a final composition in the absence of a milling auxiliary until the content of an α-form phthalocyanine in the crude copper phthalocyanine is at least 20% by weight, and adding and mixing the remaining phthalocyanine derivative to/with the dry-milled product.

5 Claims, No Drawings

PROCESS FOR THE PRODUCTION OF COPPER PHTHALOCYANINE PIGMENT COMPOSITION

FIELD OF THE INVENTION

The present invention relates to a process for the production of a copper phthalocyanine pigment composition by a dry milling method. More specifically, it relates to a process for the production of a pigment composition, which comprises dry milling a crude copper phthalocyanine and a phthalocyanine derivative in the absence of a milling auxiliary and further mixing a phthalocyanine derivative with the milled product, and which shows stability with time when dispersed in a non-aqueous vehicle and shows less "strike-through" when used as an ink.

PRIOR ART OF THE INVENTION

A finely milled copper phthalocyanine has excellent fastness, a clear color tone and a high tinting strength, and it is hence widely used for various purposes in tile industrial field of coloring materials. Since, however, a crude copper phthalocyanine produced by a general synthesis reaction is in the form of coarse crystal particles having a diameter of 1 to several tens μm, it is well known that such a crude copper phthalocyanine has insufficient pigment properties such as the tinting strength, hue, etc. which are required of pigments. For this reason, there are a variety of methods employed for converting it to a useful pigment form by finely milling a crude copper phthalocyanine to a size of approximately 0.01 to 0.5 μm.

For obtaining a fine α-form pigment, there are a method in which a crude copper phthalocyanine is dissolved in concentrated sulfuric acid (acid pasting method) and a method in which a sulfuric acid salt is formed (acid slurry method). However, both these methods are industrially undesirable due to the use of a large amount of sulfuric acid and water and in view of the treatment of waste water. Further, the method for obtaining a fine β-form pigment is largely classified into (i) a dry milling method in which a crude copper phthalocyanine is milled in the presence of a milling auxiliary such as anhydrous sodium ferrocyanide or anhydrous barium chloride or a crude copper phthalocyanine is milled in tile presence of a milling auxiliary and an organic liquid and then treated with an organic solvent and (ii) a wet milling method in which a crude copper phthalocyanine is milled with a mixing device (kneader) in the presence of a milling auxiliary such as sodium chloride and an organic liquid such as an alcohol or polyol. However, all of these methods require various steps and a large amount of energy, and are hence industrially undesirable.

Further, α-form and β-form copper phthalocyanines obtained by the above methods have another problem in that a large amount of energy is further required for dissolving aggregates of their particles in a vehicle when an ink or a pigment is prepared therefrom.

For overcoming tile above problems, JP-B-55-6670 discloses that a pigment paste can be obtained by directly suspending a dry-milled product of a crude copper phthalocyanine in a solvent or resin solution used in an ink or a coating composition without converting tile crude copper phthalocyanine into et pigment form. Further, JP-A-3-205458 discloses a copper phthalocyanine pigment composition obtained by dry milling a pigment derivative and a crude copper phthalocyanine in the absence of a milling auxiliary or by dry milling a crude copper phthalocyanine in the absence of a milling auxiliary and mixing the milled copper phthalocyanine with a pigment derivative. However, this pigment composition is insufficient in fluidity, tinting strength and stability with time when dispersed in a nonaqueous vehicle, and it is unsatisfactory in product quality since it shows "strike-through" when used for gravure printing on low-quality paper.

SUMMARY OF THE INVENTION

It is an object of tile present invention to provide a process for the production of a copper phthalocyaninc pigment composition, in which a crude copper phthalocyaninc can be converted to a pigment without a large amount of energy and the treatment of exhaust water.

It is another object of the present invention to provide a process for the production of a copper phthalocyanine pigment composition, which can give a copper phthalocyaninc pigment composition having excellent fluidity, tinting strength and stability with time when used in a coating composition or a printing ink.

It is further another object of tile present invention to provide a process for the production of a copper phthalocyaninc pigment composition, which can give a copper phthalocyaninc pigment composition which almost shows no "strike-through" when used for gravure printing on low-quality paper.

According to the present invention, there is provided a process for the production of a copper phthalocyanine pigment composition from 70 to 99% by weight of a crude copper phthalocyanine and 30 to 1% by weight of a phthalocyanine derivative selected from the group consisting of phthalocyanine derivatives of the formulae (1) and (2),

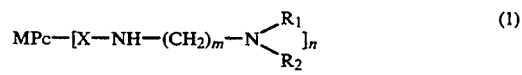

(1)

(2)

where in M is $H_2$, Al, Fe, Co, Ni, Cu or Zn, Pc is a phthalocyanine residue, X is $-SO_2-$, $-CH_2-$, $-CH_2NHCOCH_2-$ or $-CO-$, each of $R_1$ and $R_2$ is independently a hydrogen atom or an alkyl group having 1 to 5 carbon atoms, or both $R_1$ and $R_2$ are constituents of one five-membered or six-membered heterocyclic ring which may contain a nitrogen atom or an oxygen atom and which may further contain, as a substituent, an alkyl group having 5 carbon atoms or less, m is an integer of 1 to 10, and n is an integer of 1 to 4, the process comprising dry milling the entirety of the crude copper phthalocyanine and the phthalocyanine derivative in an amount of 0.5 to 10% by weight of a final composition in the absence of a milling auxiliary until the content of an α-form phthalocyanine in the crude copper phthalocyanine is at least 20% by weight, and adding and mixing the remaining phthalocyanine derivative to/with the dry-milled product.

DETAILED DESCRIPTION OF THE INVENTION

Specific examples of tile phthalocyanine derivatives used in the present invention are as follows.

CuPc—[SO$_2$NH(CH$_2$)$_3$N(C$_2$H$_5$)$_2$]$_2$
CuPc—[SO$_2$NH(CH$_2$)$_3$N(CH$_3$)$_2$]$_2$

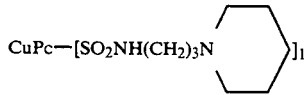

CuPc—[CH$_2$NHCOCH$_2$NH(CH$_2$)$_3$N(C$_4$H$_9$)$_2$]$_3$
CuPc—[CH$_2$NH(CH$_2$)$_5$N(C$_2$H$_5$)$_2$]$_2$
CuPc—[CH$_2$NH(CH$_2$)$_4$(CH$_3$)$_2$]$_3$
CuPc—[CH$_2$N(C$_2$H$_5$)$_2$]$_4$
CuPc—[CONH(CH$_2$)$_3$N(C$_2$H$_5$)$_2$]$_1$

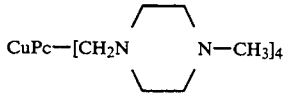

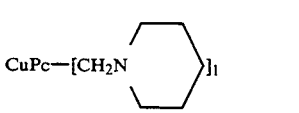

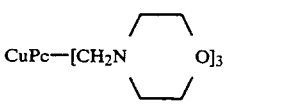

Concerning the amount of the phthalocyanine derivative, preferably, 70 to 99% by weight of the crude copper phthalocyanine and 0.5 to 10% by weight of the phthalocyanine derivative are dry milled in the absence of a milling auxiliary, and then 0.5 to 20% by weight of the phthalocyanine derivative is added to, and mixed with, the milled product. When the total amount of tile phthalocyanine derivative is less than 1% by weight, the pigment dispersion is poor in tinting strength, gloss, fluidity and stability with time. Tile use of the phthalocyanine derivative in an amount of more than 30% by weight is uneconomical. The total amount of the phtalocyanine derivative is more preferably 3 to 15% by weight. The ratio of the phthalocyanine derivative (A) which is to be dry milled with the crude copper phthalocyanine and the phthalocyanine derivative (B) to be added after the dry milling are not specially limited, while the ratio of (A): (B) is preferably 1:1 to 1:5. Further, when a phthalocyanine derivative of the formula (1) is dry milled together with the crude copper phthalocyanine first, a phthalocyanine derivative of the formula (2) may be added, and mixed with, the dry-milled product. When a phthalocyanine derivative of tile formula (2) is dry milled together with the crude copper phthalocyanine first, a phthalocyanine derivative of tile formula (1) may be added, and mixed with, tile dry-milled product.

The crude copper phthalocyanine and tile phthalocyanine derivative can be dry milled with any one of a ball mill, a vibration mill and an attriter at a milling temperature of 20° to 130° C. The pigment composition obtained by the above dry milling is a mixture of an α-form copper phthalocyanine and β-form copper phthalocyanine, and tile content of the α-form phthalocyanine is generally 20 to 100% by weight, preferably 30 to 80% by weight.

The pigment composition obtained by the process of tile present invention can be incorporated into a vehicle for a printing ink such as an offset ink or a gravure ink or a vehicle for a coating composition. The vehicle is particularly preferably selected from nonaqueous vehicles containing an aromatic organic solvent such as toluene, xylene, or the like.

The coating composition contains 1 to 20% by weight of the copper phthalocyanine pigment composition, 99 to 50% by weight of a vehicle for a coating composition and 0 to 30% by weight of other auxiliary and an extender pigment. The vehicle for a coating composition contains 80 to 20% by weight of a mixture of resins such as an acrylic resin, an alkyd resin, an epoxy resin, a polyurethane resin, a polyester resin and melamine resin and 60 to 10% by weight of a solvent such as a hydrocarbon, an alcohol, a ketone, an ether alcohol, an ether and an ester.

The gravure ink contains 3 to 30% by weight of the copper phthalocyanine pigment composition obtained by tile process of the present invention, 97 to 50% by weight of a vehicle for a gravure ink and 0 to 20% by weight of other auxiliary and an extender pigment. The vehicle for a gravure ink contains 10 to 50% by weight of a mixture of resins such as lime rosin, rosin ester, a maleic acid resin, a polyamide resin, a vinyl resin, nitrocellulose, an ethylene-vinyl acetate copolymer resin, a urethane resin, a polyester resin and melamine resin and an alkyd resin and 30 to 80% by weight of a solvent such as a hydrocarbon, an alcohol, a ketone, an ether alcohol, an ether and an ester.

EXAMPLES

The present invention will be explained more in detail hereinafter with reference to Examples, in which "part" stands for "part by weight" and "%" stands for "% by weight".

Example 1

91 Parts of a crude copper phthalocyanine synthesized by a conventional method and 2 parts of a copper phthalocyanine derivative of the below-described formula were dry milled with an attriter at 60° C. for 1.5 hours. The resultant dry milled product showed an α-form content of 68% when analyzed by X-ray diffraction. Then, 7 parts of a copper phthalocyanine derivative of the below-described formula were mixed to give an intended copper phthalocyanine pigment composition.

CuPc-[CH$_2$NHCOCH$_2$NH(CH$_2$)$_3$N(C$_4$H$_9$)$_2$]$_3$

Example 2

90 Parts of a crude copper phthalocyanine synthesized by a conventional method and 5 parts of a copper phthalocyanine derivative of the below-described formula were dry milled with an attriter at 40° C. for 1 hour. The resultant dry milled product showed an α-form content of 63 % when analyzed by X-ray diffraction. Then, 5 parts of copper phthalocyanine derivative of the below-described formula (3) were mixed to give an intended copper phthalocyanine pigment composition.

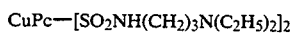

Formula (3):

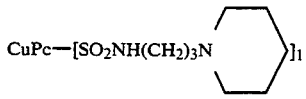

Example 3

Example 2 was repeated except that the copper phthalocyanine derivative to be dry milled with the crude copper phthalocyanine was replaced with a copper phthalocyanine derivative of the formula (3).

Formula (3):

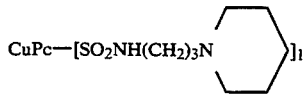

Example 4

Example 1 was repeated except that the temperature and time for the dry milling were changed to 95° C. and 1 hour. The resultant dry milled product showed an α-form content of 32% when analyzed by X-ray diffraction.

Example 5

91 Parts of a crude copper phthalocyanine synthesized by a conventional method and 2 parts of an aluminum phthalocyanine derivative of the below-described formula were dry milled with an attriter at 40° C. for 1 hour. The resultant dry milled product showed an α-form content of 66% when analyzed by X-ray diffraction. Then, 7 parts of an aluminum phthalocyanine derivative of the below-described formula were mixed to give an intended phthalocyanine pigment composition.

Example 6

Example 5 was repeated except that the phthalocyanine derivative was replaced with a nickel phthalocyanine derivative of the below-described formula.

Comparative Example 1

100 Parts of the same crude copper phthalocyanine as that used in Example 1 was dry milled with an attriter at 60° C. for 1.5 hours. The resultant milled product showed an α-form content of 68% when analyzed by X-ray diffraction.

Comparative Example 2

91 Parts of a crude copper phthalocyanine synthesized by a conventional method and 9-parts of the same copper phthalocyanine derivative as that used in Example 1 were dry milled with an attriter at 600° C. for 1.5 hours. The resultant dry milled product showed an α-form content of 68% when analyzed by X-ray diffraction.

Comparative Example 3

91 Parts of tile milled product obtained in Comparative Example 1 was mixed with 9 parts of the same copper phthalocyanine derivative as that used in Example 1.

Examples 7–10

Example 1 as repeated except that the amount of the copper phthalocyanine derivative to be dry milled together with the crude copper phthalocyanine and the amount of the copper phthalocyanine derivative to be mixed with the dry milled product were changed as shown in Table 1.

TABLE 1

| | Composition (part) | | | α-form |
| --- | --- | --- | --- | --- |
| | Dry milled | | CuPc | content (%) |
| Example | Crude CuPc | CuPc derivative | derivative mixed | of dry milled product |
| 7 | 95 | 2 | 3 | 69 |
| 8 | 93 | 3 | 4 | 67 |
| 9 | 90 | 3 | 7 | 67 |
| 10 | 85 | 5 | 10 | 65 |

(Evaluation methods)

The pigment compositions obtained in Examples and the products obtained in Comparative Examples were evaluated as the following oil coating compositions and gravure inks.

The oil coating composition was prepared by charging the pigment composition, the following components (1) and steel beads having a diameter of 3 mm into a glass bottle and dispersing them with a paint shaker for 90 minutes.

The gravure ink was prepared by charging the pigment composition, the following components (2) and steel balls having a diameter of ⅜ inch to a magnetic pot and dispersed them with a jar mill for 15 hours.

| Components (1) | |
| --- | --- |
| Pigment composition | 6 parts |
| Alkyd resin varnish | 56 parts |
| Melamine resin varnish | 28 parts |
| Solvent | 10 parts |
| Components (2) | |
| Pigment composition | 13 parts |
| Lime rosin varnish | 75 parts |
| Solvent | 12 parts |

The above-obtained pigment dispersions (oil coating compositions and gravure inks) were evaluated as follows.

1. Fluidity

Immediately after the oil coating compositions and the gravure inks were prepared, each was measured for a viscosity with a Brookfield viscometer (supplied by Tokyo Keiki) at 6 rpm and 60 rpm.

2. Gloss 2-1. Oil coating composition

An oil coating composition was spread on an art paper sheet with an applicator such that the coating had a wet thickness of 6 μm and baked in an oven at 120° to 130° C., and the coating was measured for 60°–60° gloss with a glossmeter (supplied by Suga Testing Machine).

"60°–60°" means an incident angle and reflection angle of light.

2-2. Gravure ink

A gravure ink was so adjusted by adding a solvent as to show a viscosity of 12 seconds when measured with a Zahn cup No. 3 (to be referred to as "printing viscosity" hereinafter), and then adjusted gravure ink was spread on a commercially available coat paper sheet (trade name; Henry SH) and a semi-coat paper sheet (trade name; Tokugra DX) with a bar coater such that the spread inks had a wet thickness of 6 μm, and each spread ink was measured for a gloss in the same manner as in the measurement of the oil coating composition.

3. Tinting strength 3-1. Oil coating composition

An oil coating composition was mixed with a predetermined amount of a white coating composition, and the mixture was spread on an art paper sheet, baked and dried. The resultant coating was visually evaluated.

3-2. Gravure ink

Each of a coat paper sheet and a semi-coat paper sheet on which a gravure ink was spread by the above method (2-2) were measured for a reflection density with a Gretag densitometer.

4. Strike-through of gravure ink

The strike-through of a gravure ink spread on a semi-coat paper by the above method (2-2) was evaluated by measuring ΔE (color difference between a portion of the reverse side of the semi-coat paper on which the gravure ink was spread and a portion of the reverse side of the semi-coat paper on which no gravure ink was spread).

5. Stability of gravure ink with time

A gravure ink which had been allowed to stand at 50° C. for 1 week was measured for a viscosity at 6 rpm and 60 rpm with a Brookfield viscometer. Then, the gravure ink was adjusted to a printing viscosity, spread on a coat paper sheet and a semi-coat paper sheet with a bar coater such that the spread ink had a wet thickness of 6 μm, and measured for gloss (60°—60°), reflection density (Gretag) and strike-trough state (ΔE).

Table 2 shows the evaluation results of the oil coating compositions, Table 3 shows the evaluation results of the gravure inks immediately after they were prepared, and Table 4 shows the evaluation results of the gravure inks which had been allowed to stand for 1 week.

TABLE 2

|  | Viscosity 1) (cps) | Gloss 2) (%) | Tinting strength 3)* (%) |
| --- | --- | --- | --- |
| Ex. 1 | 280/270 | 87 | standard |
| Ex. 2 | 310/305 | 88 | +2 |
| Ex. 3 | 317/309 | 86 | +1 |
| Ex. 4 | 225/209 | 86 | −2 |
| Ex. 5 | 320/301 | 84 | +1 |
| Ex. 6 | 300/278 | 85 | equivalent |
| Ex. 7 | 305/288 | 86 | −1 |
| Ex. 8 | 230/218 | 90 | equivalent |
| Ex. 9 | 240/230 | 91 | −1 |
| Ex. 10 | 305/292 | 88 | +2 |
| CEx. 1 | 7,200/3,300 | 61 | −15 |
| CEx. 2 | 539/448 | 86 | equivalent |
| CEx. 3 | 295/282 | 84 | −9 |

Ex. = Example, CEx. = Comparative Example
1) Brookfiled viscometer: 6 rpm value/60 rpm value
2) Glossmeter: 60° - 60° value
3) Difference from standard in visual observation
*In tinting strength, for example, +2 means that the tinting strength of an oil coating composition is equivalent to that of the standard oil coating composition when the amount of a white coating composition is increased by 2%.

TABLE 3

|  | Viscosity 1) (cps) | Gloss (%) 2) | | Density 3) | | Strike-through of ink 4) (ΔE) |
| --- | --- | --- | --- | --- | --- | --- |
|  |  | Coat paper | Semi-coat paper | Coat paper | Semi-coat paper |  |
| Ex. 1 | 98/92 | 56.5 | 21.6 | 2.75 | 2.58 | 7.6 |
| Ex. 2 | 115/109 | 57.9 | 21.0 | 2.78 | 2.57 | 7.9 |
| Ex. 3 | 120/112 | 56.7 | 21.8 | 2.76 | 2.56 | 8.0 |
| Ex. 4 | 92/87 | 56.9 | 21.6 | 2.71 | 2.56 | 7.1 |
| Ex. 5 | 128/119 | 56.5 | 19.8 | 2.74 | 2.53 | 7.7 |
| Ex. 6 | 110/105 | 57.1 | 20.9 | 2.76 | 2.54 | 7.4 |
| Ex. 7 | 117/108 | 55.5 | 20.8 | 2.73 | 2.53 | 8.0 |
| Ex. 8 | 112/104 | 57.5 | 22.2 | 2.76 | 2.55 | 7.3 |
| Ex. 9 | 101/94 | 58.1 | 22.0 | 2.77 | 2.57 | 7.5 |
| Ex. 10 | 108/99 | 58.0 | 21.8 | 2.75 | 2.55 | 7.7 |
| CEx. 1 | 450/390 | 47.1 | 10.2 | 2.05 | 1.88 | 15.1 |
| CEx. 2 | 190/171 | 57.7 | 19.4 | 2.73 | 2.38 | 10.1 |
| CEx. 3 | 110/104 | 53.7 | 21.0 | 2.64 | 2.48 | 7.9 |

Ex. = Example, CEx. = Comparative Example
1) Brookfield viscometer: 6 rpm value/60 rpm value
2) Grossmeter: 60° - 60° value
3) Reflection density value obtained with Gretag densitomer
4) A color difference between a portion of the reverse side of paper on which gravure ink was spread and a portion of the reverse side of the paper on which no gravure ink was spread. The larger the ΔE value is, the greater the the degree of strike-through is.

TABLE 4

|  | Viscosity 1) (cps) | Gloss (%) 2) | | Density 3) | | Strike-through of ink 4) (ΔE) |
| --- | --- | --- | --- | --- | --- | --- |
|  |  | Coat paper | Semi-coat paper | Coat paper | Semi-coat paper |  |
| Ex. 1 | 190/185 | 53.5 | 21.6 | 2.74 | 2.57 | 7.7 |
| Ex. 2 | 230/201 | 54.3 | 20.3 | 2.76 | 2.52 | 8.1 |
| Ex. 3 | 231/-210 | 53.9 | 20.2 | 2.74 | 2.54 | 8.2 |
| Ex. 4 | 183/171 | 54.2 | 21.8 | 2.71 | 2.52 | 7.3 |
| Ex. 5 | 218/205 | 54.8 | 20.1 | 2.72 | 2.53 | 8.2 |
| Ex. 6 | 230/211 | 53.2 | 19.9 | 2.73 | 2.51 | 8.3 |
| Ex. 7 | 240/218 | 53.1 | 19.7 | 2.70 | 2.49 | 8.3 |
| Ex. 8 | 202/190 | 55.0 | 21.8 | 2.73 | 2.54 | 7.7 |
| Ex. 9 | 188/175 | 55.1 | 21.2 | 2.76 | 2.55 | 7.5 |

TABLE 4-continued

| | Viscosity 1) (cps) | Gloss (%) 2) Coat paper | Semi-coat paper | Density 3) Coat paper | Semi-coat paper | Strike-through of ink 4) (ΔE) |
|---|---|---|---|---|---|---|
| Ex. 10 | 203/192 | 54.9 | 20.2 | 2.74 | 2.53 | 7.9 |
| CEx. 1 | 910/722 | 30.5 | 6.1 | 1.83 | 1.67 | 16.5 |
| CEx. 2 | 670/534 | 49.2 | 16.1 | 2.61 | 2.11 | 13.1 |
| CEx. 3 | 225/209 | 52.2 | 19.1 | 2.61 | 2.44 | 8.3 |

Ex. = Example, CEx. = Comparative Example
1) Brookfield viscometer: 6 rpm value/60 rpm value
2) Grossmeter: 60° - 60° value
3) Reflection density value obtained with Gretag densitomer
4) A color difference between a portion of the reverse side of paper on which gravure ink was spread and a portion of the reverse side of the paper on which no gravure ink was spread. The larger the ΔE value is, the greater the the degree of strike-through is.

In the present invention, the phthalocyanine derivative and a crude copper phthalocyanine are dry milled together and then the phthalocyanine derivative is further added, whereby the phthalocyanine pigment particles in a vehicle can be controlled into a proper size and the phthalocyanine pigment composition can be effectively used in a coating composition and a printing ink. The pigment composition obtained according to the process of the present invention is excellent in fluidity, tinting strength and stability with time over, and freer from strike-through than, a composition obtained by merely adding a phthalocyanine derivative or dry milling the entirety o f the phthalocyanine derivative together with a crude copper

What is claimed is:

1. A process for the production of a copper phthalocyanine pigment composition from 70 to 99% by weight of a crude copper phthalocyanine and 30 to 1% by weight of a phthalocyanine derivative selected from the group consisting of phthalocyanine derivatives of the formulae (1) and (2),

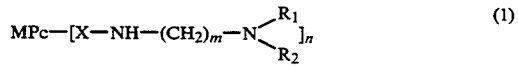

(1)

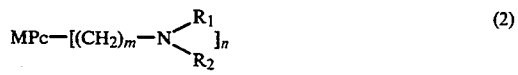

(2)

wherein M is $H_2$, Al, Fe, Co, Ni, Cu or Zn, Pc is a phthalocyanine residue, X is $-SO_2-$, $-CH_2-$, $-CH_2NHCOCH_2-$ or $-CO-$, each of $R_1$ and $R_2$ is independently a hydrogen atom or an alkyl group having 1 to 5 carbon atoms, or both $R_1$ and $R_2$ are constituents of one five-membered or six-membered heterocyclic ring which may contain a nitrogen atom or an oxygen atom and which may further contain, as a substituent, an alkyl group having 5 carbon atoms or less, m is an integer of 1 to 10, and n is an integer of 1 to 4, the process comprising dry milling the entirety of the crude copper phthalocyanine and the phthalocyanine derivative in an amount of 0.5 to 10% by weight of a final composition in the absence of a milling auxiliary until the content of an α-form phthalocyanine in the crude copper phthalocyanine is at least 20% by weight, and adding and mixing the remaining phthalocyanine derivative to/with the dry-milled product.

2. A process according to claim 1, wherein the phthalocyanine derivative to be added to the dry milled product is used in an amount of 1/1 to 5/1 of the amount of the phthalocyanine derivative dry milled together with the crude copper phthalocyanine.

3. A process according to claim 1, wherein the remaining phthalocyanine derivative added to the dry milled product is the same as the phthalocyanine derivative dry milled together with the crude copper phthalocyanine.

4. A process according to claim 1, wherein a phthalocyanine derivative different from the phthalocyanine derivative dry milled together with the crude copper phthalocyanine is added to the dry milled product.

5. A process according to claim 1, wherein the crude copper phthalocyanine and the phthalocyanine derivative are dry milled until the dry milled product has an α-form content of 30 to 80% by weight.

* * * * *